March 23, 1937.　　E. S. MEEHAN　　2,074,484
VEHICLE
Filed July 26, 1935　　3 Sheets-Sheet 3
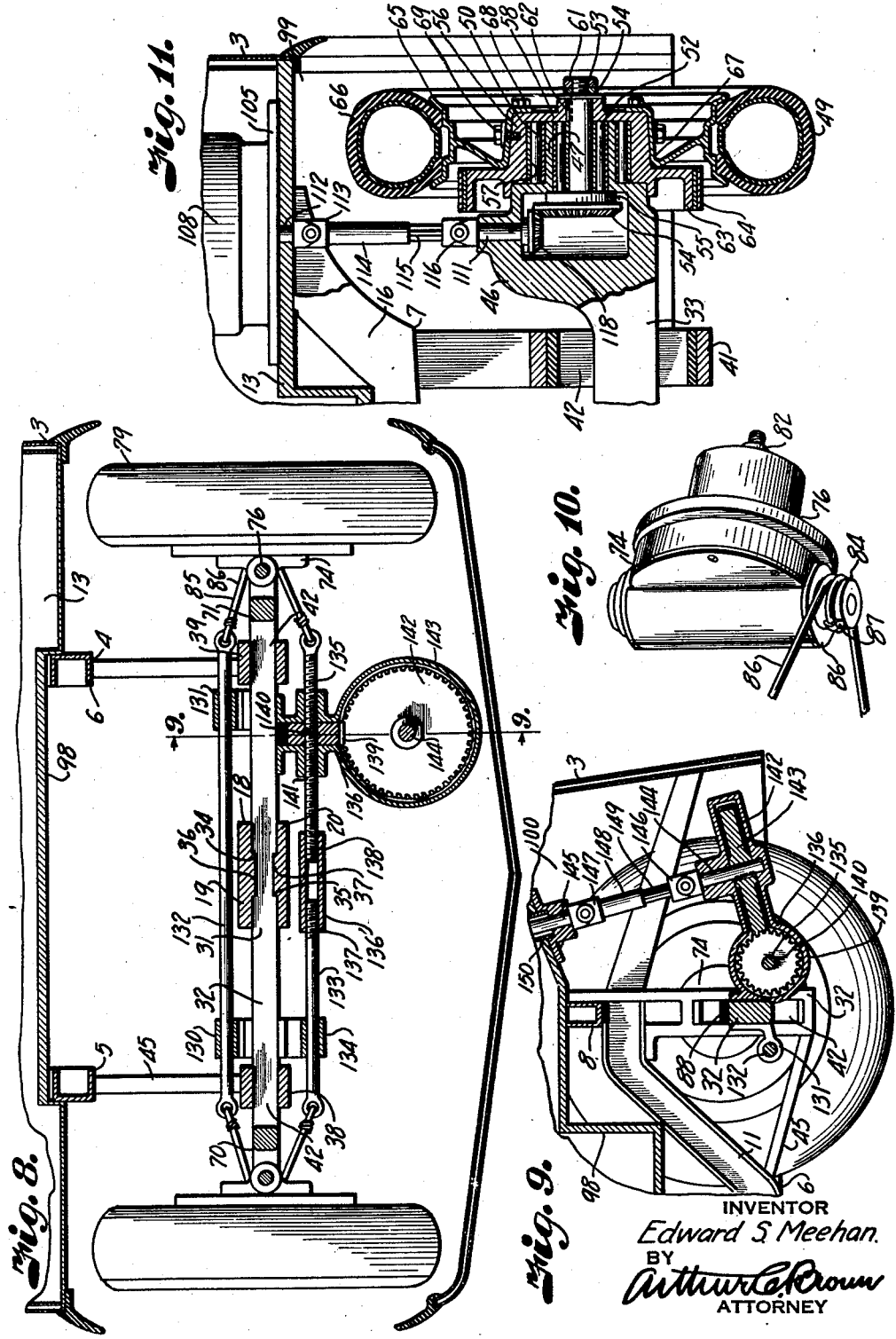
INVENTOR
Edward S. Meehan.
BY
ATTORNEY Patented Mar. 23, 1937

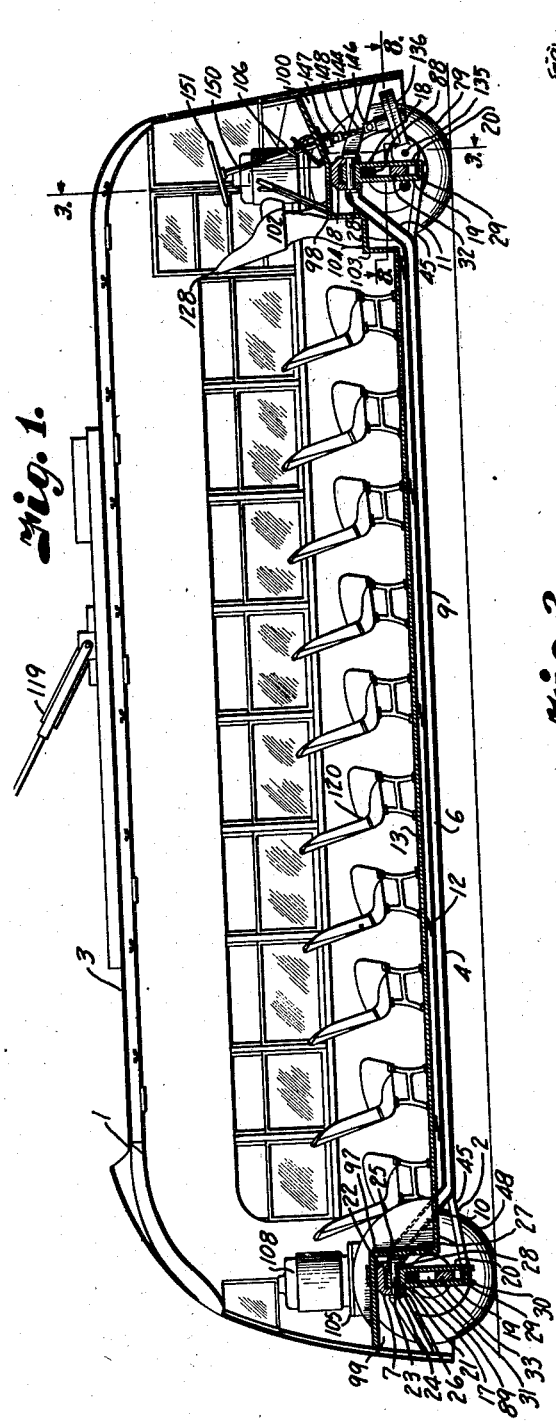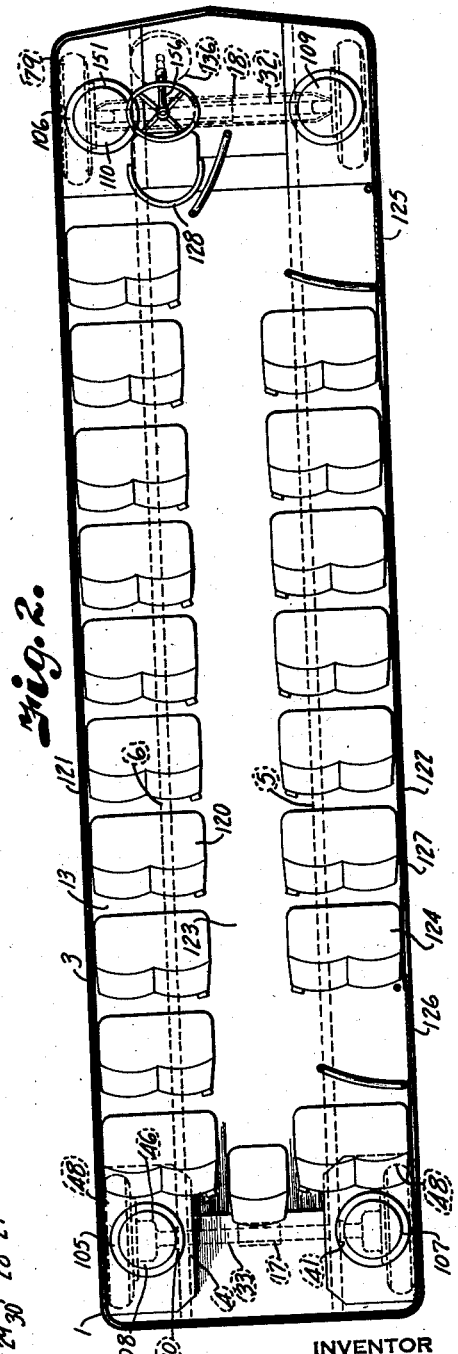

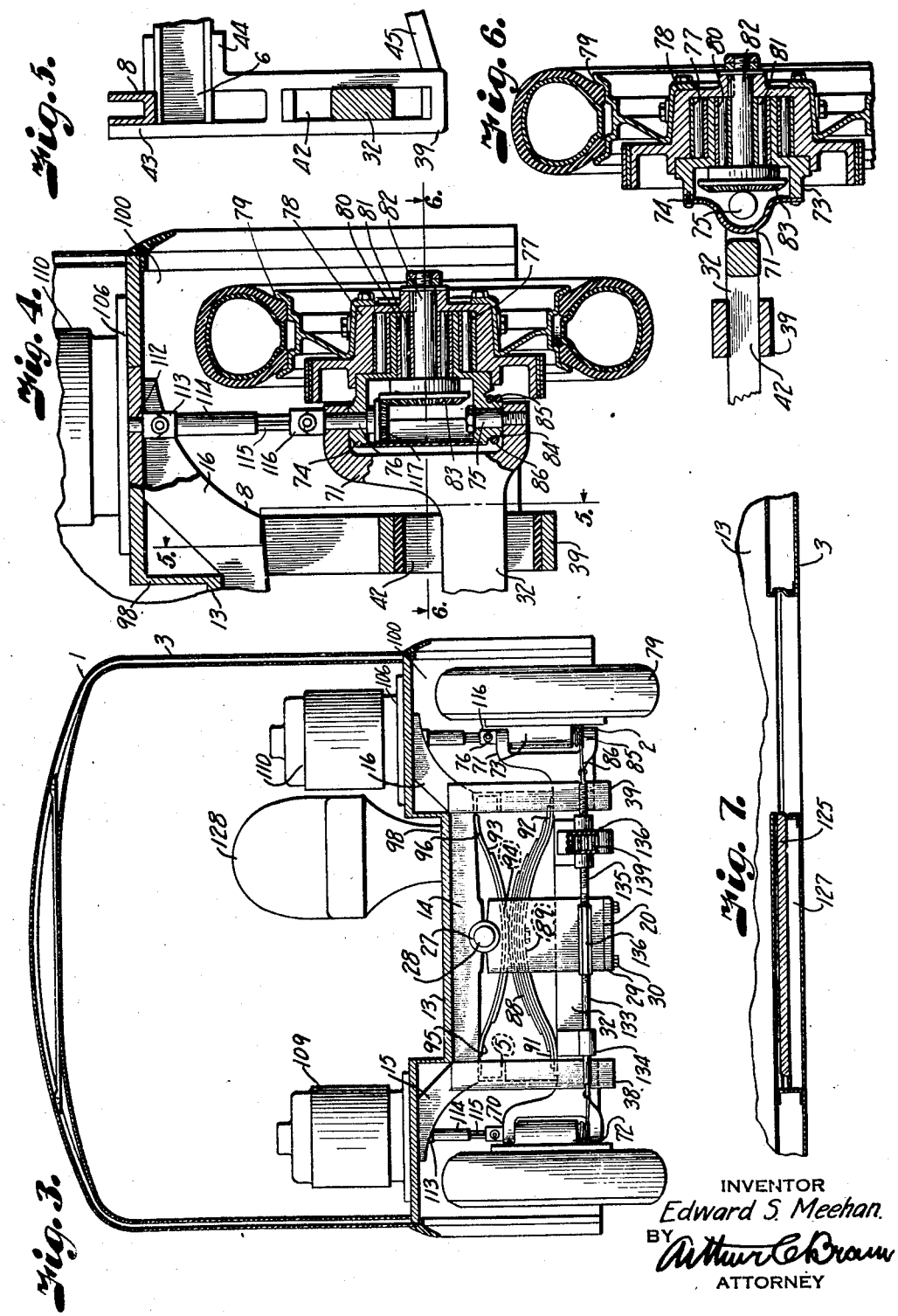

2,074,484

UNITED STATES PATENT OFFICE 2,074,484

VEHICLE

Edward S. Meehan, Kansas City, Mo.

Application July 26, 1935, Serial No. 33,300

15 Claims. (Cl. 180—54)

This invention relates to vehicles, particularly those of the motor coach type, and has for its principal object to provide a vehicle of this character constructed to promote comfort and safety of the passengers.

Other important objects of the invention are to provide a coach equipped with front and rear drive, to provide greater seating capacity per unit of floor area, to provide a construction wherein all the seats face the front of the vehicle, to provide for suspension of the entire seating compartment between the front and rear axle units of the vehicle, to eliminate steps to and from the seating compartment, to provide an interior arrangement affording the operator an unobstructed view of both the entrance and exit doors, to provide an improved axle and spring mounting of the body of the vehicle, and to provide a lower center of gravity.

In accomplishing these and other objects of the invention as hereinafter pointed out, I have provided improved details of structure, the preferred form of which is illustrated in the accompanying drawings wherein:

Fig. 1 is a longitudinal section through a motor coach embodying the features of the present invention.

Fig. 2 is a horizontal section through the coach particularly illustrating the seating arrangement.

Fig. 3 is a vertical cross-section on the line 3—3, Fig. 1.

Fig. 4 is an enlarged detail section through one of the front wheels of the coach, particularly illustrating the driving connection between the motor and wheel.

Fig. 5 is a section on the line 5—5 of Fig. 4, illustrating one of the axle guide brackets for retaining the axle in transverse alignment with the forward travel of the vehicle.

Fig. 6 is a horizontal section on the line 6—6, of Fig. 4.

Fig. 7 is an enlarged horizontal section through the entrance door.

Fig. 8 is a horizontal section through the front wheel and axle unit on the line 8—8 of Fig. 1, illustrating steering mechanism therefor.

Fig. 9 is a detail section on the line 9—9 of Fig. 8.

Fig. 10 is a detail perspective view of one of the front wheel mounting hubs.

Fig. 11 is a section taken through one of the rear wheels, and illustrating the drive therefor, similarly to Fig. 4.

Referring more in detail to the drawings:

1 designates a motor coach constructed in accordance with the present invention, including a chassis 2 supporting a body 3. The chassis 2 includes a frame 4 comprising longitudinal side members 5 and 6 connected at the ends by transverse members 7 and 8. The longitudinal members 5 and 6 are preferably of channel shaped cross-section, and have dropped central portions 9 terminating in upwardly inclined ends 10 and 11, which connect with the transverse members 7 and 8.

The drop portions of the longitudinal frame members are connected at suitably spaced intervals by transverse members 12 to support the floor 13 of the vehicle body later described. The transverse end members 7 and 8 are also of channel shape and include horizontal central portions 14 terminating above the side members in upwardly inclined bracket shaped ends 15 and 16, as best shown in Fig. 3.

Pivotally connected with the horizontal portions of the end members and directly in the longitudinal center of the chassis frame are axle retaining blocks 17 and 18, each including spaced side plates 19 and 20 connected at their upper edges by a web 21 having a central lug 22 provided with a transverse opening 23. Extending through the opening 23 and through aligning openings 24 and 25 in ears 26 and 27 that depend from the end members are the pivot pins 28 by which the blocks are pivotally connected to the frame. The plates are connected at their lower ends by a closure plate 29 that is removably attached by cap screws 30 to form a substantially rectangular opening 31 extending transversely through the blocks 17 and 18 to respectively accommodate the front and rear axles 32 and 33 of the vehicle.

The axles 32 and 33 include substantially rectangular shaped beams conforming in width to the spacing between the plates 19 and 20 and have rectangular notches 34 and 35 extending perpendicularly of their front and rear faces to slidably engage retaining ribs 36 and 37 that are formed on the inner faces of the plates, as best illustrated in Fig. 8, to retain the axle against lateral movement with respect to the blocks but to permit vertical movement therein, as later described.

Depending from the ends of the horizontal portions of each of the end members 7 and 8 are axle guide brackets 38 and 39 for the front axle and 40 and 41 for the rear axle. The guide brackets have openings 42 for guidingly passing the outer ends of the axles and to retain them for arcuate movement in a perpendicular plane as the axle blocks 17 and 18 pivot upon the pins 28. The upper ends of the brackets terminate in vertical flanges 43 that are attached to the side faces of the end members and horizontally extending flanges 44 that are secured to the lower faces of the longitudinal frame members, as best shown in Fig. 5. The lower ends of the brackets are also braced from the drop portions of the longitudinal frame members by means of the brace bars 45.

The rear axle 33 is provided at its ends with gear housings 46 terminating in wheel spindles 47 on which the rear wheels 48 and 49 are rotatably mounted on anti-friction bearings 50 of conventional automotive design. Formed within the spindles are bearing openings mounting anti-friction bearings 52 to form bearing supports for live axles 53, Fig. 11. The axles 53 have their inner ends extending within the gear housings 46 to mount bevelled gears 54 that have collar portions 55 which engage the inner walls of the gear housings circumferentially of the openings and prevent retractive movement of the axles within the bearings 52.

The rear wheels include hub members 56 having recessed portions 57 for the anti-friction bearings 50. The hubs 56 have ends 58 that are provided with central openings to pass the ends of the axles 53, which are splined thereto by suitable keys 62. The hubs are retained on the wheel spindles by means of nuts 61 that are threaded on the outer ends of the axles 53 and engage against washers that in turn bear against the hubs, as clearly shown in Fig. 11. The hubs also include conventional type brake drums 63 equipped with suitable brake bands 64.

The wheels include rims 65 for mounting tires 66 and hub flanges 67 adapted to sleeve over the outer periphery of the hub 56.

In order to retain the wheel in tight engagement with the hub, the outer face of the hub and the inner contour of the hub flange of the wheel are preferably tapered as shown in Fig. 11, so that when the wheel is drawn into engagement with the hub 56 by the bolts 68, the wheels will be wedgingly retained thereon to relieve strain upon the fastening bolts. In order to additionally anchor the wheels on the hubs, the hub portions of the wheels are provided with radial openings through which bolts 69 are projected into the body portion of the hubs 56.

The front axle 32 is of a construction similar to the rear axle, except that the ends thereof carry spindle yokes 70 and 71 for mounting the wheel spindles 72 and 73. The spindles 72 and 73 include gear housings 74 which are pivotally mounted in the spindle yokes at their lower ends by fixed king pins 75 and at their upper ends by aligning drive shafts 76 later described. Mounted upon the wheel spindles are outer anti-friction bearings 77 for mounting the front wheel hubs 78 which are identical in construction to the rear wheel hubs, previously described, and which mount the front wheels 79.

The spindles are also provided with bearing openings 80 mounting bearings 81 to carry live axle shafts 82 that have their inner ends projecting within the gear housings to mount bevelled gears 83 similar to the bevelled gears 54 of the rear axle, previously described. The outer ends of the axle shafts are splined to the wheel hubs in the same manner as described in connection with the rear wheel construction.

Formed on the lower ends of each of the housings, circumferentially of the fixed king pins 75, are sheaves 84 about which are secured the lays 85 of flexible cables 86, the central lay of the cables being secured to the sheaves by clips 87 so that when the cables are operated by the steering mechanism, later described, the spindles are caused to rotate to guide the vehicle.

In order to yieldingly support the ends of the frame upon the front and rear axles, I have provided transverse main springs 88 for the front and 89 for the rear, having central portions fixed to the blocks 17 and 18 and their outer ends 91 and 92 bearing upon the upper faces of the axles, as best shown in Fig. 3.

To stabilize the body against lateral pivoting movement, the blocks carry reversely arranged elliptical springs 93 having central portions 94 clamped betwen the main springs 89 and the connecting webs of the blocks, 17 and 18 respectively, as shown in Fig. 3. The outer ends 95 and 96 of the stabilizing springs engage under the central portions 14 of the end frame members 7 and 8.

The body of the vehicle 2 may be of any conventional design, however the floor portion 13 thereof has upwardly offset ends 97 and 98 to cooperate with the adjacent side walls of the body to form axle housings 99 and 100 respectively. The upwardly offset portion 97 at the rear of the vehicle is connected to the rear end of the floor by a vertical wall while the front offset portion of the floor is connected with the front edge of the floor 13 by risers 102 and 103 and by an intermediate tread 104.

Extending laterally from the upwardly offset end portions of the floor and carried by the bracket shaped ends 15 and 16 of the respective end members 7 and 8 are platforms 105 and 106 for mounting motors 107 and 108 for driving the rear wheel unit and motors 109 and 110 for driving the front wheel unit, as now to be described.

The motors 107—108 and 109—110 are fixed to the platforms in axial alignment with the drive shafts 76 of the front axle and similarly arranged drive shafts 111 for the rear axle. The armature shafts 112 of the respective motors are connected by universal joints 113 with a telescoping drive shaft 114 that has sliding connection on a shaft section 115 which in turn is connected by a universal joint 116 with the respective drive shafts 76 and 111. It is thus apparent that the flexible motor connections with the drive shafts compensate for the various movements of the axles relatively to the body of the vehicle, yet they provide for positive driving connection with the wheels of the vehicle, whereby the wheels of the vehicle are each actuated by an individual motor. The drive shafts 76 and 111 project within the gear housings 74 and 46 to mount bevelled gears 117 for the front axle and 118 for the rear axle to mesh with the respective gears 83 and 54.

In the illustrated instance, the motor are supplied with current from line wires (not shown) through trolleys 119 mounted on top of the body, as shown in Fig. 1.

While I have particularly illustrated electrical motors as the driving means, it is obvious that other forms of motors such as internal combustion engines may be substituted for the motors illustrated, and I do not wish to be limited to this specific illustration of the invention.

The horizontal portion 13 of the floor constitutes the floor of the passenger compartment and mounts rows of passenger seats 120, which extend along the respective sides 121 and 122 of the vehicle, all facing toward the front, and spaced apart to form a central aisle 123. The seats 124 on the right hand side of the vehicle are so spaced as to provide access to a front entrance door 125 adjacent the front offset and to a rear entrance door 126. The doors preferably slide within housings 127 that are formed within the side wall 122 of the vehicle, as best illustrated in Fig. 7. By thus opening the doors they do not interfere with the driver's view of passengers leaving or boarding the vehicle.

The driver's station 128 is located on the left hand side of the front offset, and is, therefore, at a higher elevation than the seats 120, so as to permit unobstructed view of both the front and rear doors of the vehicle.

In order to steer the front wheels, the front axle carries bearing brackets 130 and 131 projecting from its rear side to slidingly mount a rod 132 that is connected to one of the ends of the steering cables 86. The opposite ends of the steering cables are connected by a similar tie rod including a section 133 that is slidable in a bearing bracket 134 projecting from the front of the axle and a threaded section 135 that is rotably mounted within a gear housing 136 that is carried by the axle at the end opposite to the bracket 134, as best shown in Fig. 8. The rod sections 133 and 135 are connected by an internally threaded coupling 136' engaging the threaded ends 137 and 138 of the sections, as shown in Fig. 8. Mounted on the threaded section within the housing 136 is a worm 139 having internal threads 140 for engaging the external threads 141 of the shaft section 135. The gear housing 136 also includes an extension 142 to mount a worm gear 143 meshing with the worm 139. The worm gear is keyed to a shaft 144 that is connected to a steering shaft 145 by universal joints 146 and 147, interconnected by telescoping shaft sections 148 and 149 similar to the drive shaft connection previously described. The shaft 145 is rotatably mounted within a steering post 150 carrying a steering wheel 151 in convenient location to the driver's station 111.

A passenger will enter a coach constructed as described through the door 125 by stepping from the street or curbing directly onto the floor 13, since due to the dropped center construction no steps are necessary.

The passenger, upon moving down the aisle or taking any one of the seats, will not obstruct the operator's view of the exit door 126. The operator can, therefore, observe when it is safe to close the exit door after a passenger has left the coach and there is no danger of shutting the door either on the passenger or any part of his clothing.

When the coach is under way the axle units can move freely with the road irregularities without imparting road shocks to the passengers. The suspended seating compartment also allows for a lower center of gravity to promote safety and riding comfort of the passengers. The individual drive for each wheel provides for compactness and permits of the drop center construction thereby increasing the seating capacity of the coach for a given dimension.

What I claim and desire to secure by Letters Patent is:

1. In a vehicle of the character described, a frame having a dropped central portion and upwardly offset ends, front and rear axles extending transversely of said offset ends, wheels supporting the ends of said axles, means pivotally connecting said axles with the upwardly offset ends of the frame, and means mounted on said offset ends for driving said wheels.

2. In a vehicle of the character described, a frame having a dropped central portion and upwardly offset ends, front and rear axles extending transversely of said offset ends, wheels supporting the ends of said axles, means mounted on said offset ends for driving said wheels, means pivotally and slidably connecting said axles with the offset ends of the frame, and springs mounted between the axles and said offset ends of the frame for supporting the frame.

3. In a vehicle of the character described, a frame having a dropped central portion and upwardly offset ends, front and rear axles extending transversely of said offset ends, wheels supporting the ends of said axles, means mounted on said offset ends for driving said wheels, means pivotally and slidably connecting said axles with the offset ends of the frame, and springs mounted between the axles and said offset ends of the frame for supporting the frame including means for stabilizing the frame from side sway on said pivotal connections.

4. In a vehicle of the character described, a frame having a dropped central portion and upwardly offset ends, wheel and axle units, means for pivotally connecting said units with said offset ends at the longitudinal center of said frame, means for stabilizing the frame from side sway incidental to said pivotal connections, and means mounted on said offset ends for driving said wheel units.

5. In a vehicle of the character described, a frame having a dropped central portion and upwardly offset ends, wheel and axle units, means for pivotally connecting the axle units with said offset ends at the longitudinal center of said frame, means for stabilizing the frame from side sway incidental to said pivotal connections, individual motors supported on said offset ends, and flexible driving connections between the motors and the wheels of said units.

6. In a vehicle of the character described, a frame having a dropped central portion and upwardly offset ends, front and rear axles extending transversely of said offset ends, wheels supporting the ends of said axles, means pivotally connecting said axles with the upwardly offset ends of the frame, motors supported at the opposite sides of said offset ends, and driving connections between the respective motors and the wheels supporting the corresponding ends of said axles.

7. In a vehicle of the character described, a frame having a dropped central portion and upwardly offset ends, front and rear axles extending transversely of said offset ends, wheels supporting the ends of said axles, means pivotally connecting said axles with the upwardly offset ends of the frame, motors supported at the sides of one of said offset ends, and driving connections between the motors and the wheels supporting the axle at that end of the frame.

8. In a vehicle of the character described, a frame having a dropped central portion and upwardly offset ends, front and rear axles extending transversely of said offset ends, wheels supporting the ends of said axles, means mounted on said offset ends for driving said wheels, means pivotally and slidably connecting said axles with the offset ends of the frame, guide brackets depending from said offset ends to guidingly engage the ends of the axles, and springs mounted between the axles and said offset ends of the frame for supporting the frame.

9. In a vehicle of the character described, a frame having a dropped central portion and upwardly offset ends, wheel and axle units, means mounted on said offset ends for driving said wheel units, means for pivotally connecting the axle units with said offset ends at the longitudinal center of said frame, guide brackets depending from said offset ends to guidingly engage the ends of the axle units, and means for stabilizing the frame from side sway incidental to said pivotal connections.

10. In a vehicle of the character described, a frame having a dropped central portion and upwardly offset ends, axles, wheels supporting the axles, means for pivotally connecting the axles with said offset ends at the longitudinal center of said frame, means for stabilizing the frame from side sway incidental to said pivotal connections, means for steering a pair of said wheels, individual motors supported on said offset ends, and flexible driving connections between the motors and the wheels.

11. In a vehicle of the character described, a frame having a dropped central portion and upwardly offset ends, front and rear axles extending transversely of said offset ends, wheels supporting the ends of said axles, means for steering a pair of said wheels, means pivotally connecting said axles with the upwardly offset ends of the frame, motors supported at the sides of one of said offset ends, and driving connections between the motors and the wheels supporting the axle at that end of the frame.

12. In a vehicle of the character described, a frame having a dropped central portion and upwardly offset ends, front and rear axles extending transversely of said offset ends, wheels supporting the ends of said axles, steering connections between said front axle and supporting wheels, means pivotally connecting said axles with the upwardly offset ends of the frame, motors supported at opposite sides of said offset ends, and driving connections between the respective motors and the wheels supporting the corresponding ends of said axles.

13. In a vehicle of the character described, a frame having a dropped central portion and upwardly offset ends, passenger seats mounted on said dropped central portion, a driver's seat mounted on one of said upwardly offset ends, axles, wheels supporting the axles, means for pivotally connecting the axles with said offset ends at the longitudinal center of said frame, means for stabilizing the frame from side sway incidental to said pivotal connections, means for steering a pair of said wheels, individual motors supported on said offset ends, and flexible driving connections between the motors and the wheels.

14. In a vehicle of the character described, having a body, a frame supporting said body having a dropped central portion and upwardly offset ends, doors slidably mounted in said body having bottom edges located in alignment with said dropped central portion of said frame, front and rear axles extending transversely of said offset ends, wheels supporting the ends of said axles, means pivotally connecting said axles with the upwardly offset ends of the frame, motors supported at opposite sides of said offset ends, and driving connections between the respective motors and the wheels supporting the corresponding ends of said axles.

15. In a vehicle of the character described, a frame having a dropped central portion and upwardly offset ends, passenger seats mounted on said dropped central portion, a driver's seat mounted on one of said offset ends, front and rear axles extending transversely of said offset ends, said front axle being provided with a housing, means pivotally connecting said axles with the upwardly offset ends of the frame, wheels supporting the ends of said axles, flexible steering connections between said front axle and said wheels including a flexible member mounted in said front axle housing and extending upwardly adjacent the driver's seat to compensate for the pivotal connection of said front axle with one of said upwardly offset ends, motors supported at the sides of one of said offset ends, and driving connections between the motors and the wheels supporting the axle at that end of the frame.

EDWARD S. MEEHAN.